United States Patent Office 3,531,567
Patented Sept. 29, 1970

3,531,567
XEROSIN FRACTIONS AND METHOD
OF PREPARATION
Frank M. Berger, Princeton, Bernard J. Ludwig, North Brunswick, and Jean Pierre Rosselet, Princeton, N.J., assignors to Carter-Wallace, Inc., New York, N.Y., a corporation of Maryland
No Drawing. Filed July 27, 1966, Ser. No. 568,139
Int. Cl. A61k 21/00
U.S. Cl. 424—123                         4 Claims

ABSTRACT OF THE DISCLOSURE

A method for separating a xerosin fraction which is non-precipitable under acid condition from a xerosin fermentation mixture which consists of a liquid phase and solid whole cell material admixtured therewith. The material is separated from the liquid phase, autolyzed or mechanically ruptured and the spent material is removed from the resulting second liquid phase. The second liquid phase is acidified to pH 2–4, the resutling acid insoluble precipitate is removed therefrom, and neutralized. The addition of the precipitating agent causes precipitation of the desired fraction.

The first liquid phase is treated in a similar manner to obtain additional material.

---

The present invention relates to a xerosin fraction which is non-precipitable under acid conditions and to a method of obtaining same. More particularly, the invention relates to a method of obtaining a novel xerosin fraction from a xerosin fermentation mixture consisting of a liquid phase having solid whole cell material admixed therewith.

Xerosin is a microbial product, active as an anti-inflammatory agent and capable of beneficially affecting certain viral diseases, which was described by Groupe et al. in U.S. Pat. No. 3,039,923, issued on June 19, 1962. Said patent describes and claims a fermentation method for producing xerosin, said method comprising the steps of culturing *Achromobacter xerosis* No. 134, a strain of which is deposited in the culture collection of the Institute of Microbiology of Rutgers, the State University, New Brunswick, N.J., removing solid matter from the liquid culture medium, precipitating the crude xerosin from the liquid culture by adjusting the pH thereof to a value of about 2 to about 4, and purifying said crude xerosin by repeated solution in an aqueous medium having a pH greater than about 4 and reprecipitation by adjusting the pH of the resulting solution to an acid condition of about 2 to about 4. The xerosin product obtained by Groupe et al. is light tan to white solid, having an average nitrogen content of about 10% by weight and an average phosphorous content of about 2% by weight. The sulfur content of said xerosin product is reported as apparently being zero.

It is an object of the invention to provide a novel xerosin fraction which is non-precipitable under acid conditions and has valuable properties. It is another object of the invention to provide a novel xerosin fraction which, by virtue of its greater microbial activity, is substantially more useful than previously-described xerosin fractions. It is still another objects of the invention to provide a novel method of obtaining said xerosin fraction from a xerosin fermentation mixture. It is a further object of the invention to provide a method of obtaining said xerosin fraction from the solid cell material present in the liquid fermentation medium as well as from the liquid medium itself. These and other objects of the invention will in part be obvious and in part become apparent to those skilled in the art in the light of the instant specification.

In its broad aspect, the present invention relates to a method for separating a xerosin fraction which is non-precipitable under acid conditions from a xerosin fermentation mixture, said mixture consisting of a liquid phase having solid whole cell material admixed therewith, said method comprising the steps of:

(a) Separating the solid whole cell material from the first liquid phase;
(b) Autolyzing or mechanically rupturing the solid cell material to obtain an admixture of spent cell material in a second liquid phase;
(c) Separating said spent cell material from said second liquid phase;
(d) Acidifying said second liquid phase to a pH of about 2–4;
(e) Collecting the acid-insoluble precipitate which separates therefrom;
(f) Neutralizing said second liquid phase;
(g) Adding to said second liquid phase a precipitating agent to precipitate a non-acid precipitable xerosin fraction;
(h) Collecting said non-acid-precipitable xerosin fraction; and
(i) Treating the first liquid phase from step (a) by the method of steps (d) to (h) to obtain additional non-acid-precipitable xerosin material.

The relative amounts if non-acid-precipitable xerosin material (which, hereinafter, for the sake of simplicity, will be referred to as NPM) obtained from the solid whole cell material and from the liquid fermentation phase have been found to depend essentially on the length of the fermentation period. For example, if the fermentation is carried out for a period of 12 hours, relatively higher amounts of NPM are obtained from the cell material than if the fermentation is carried out for longer periods of time, i.e., 48 hours. Conversely, the relative amounts of product recovered from the liquid fermentation phase increases with time of fermentation.

The above points out an advantage of the present invention which could be utilized particularly in producing the novel fractions of the invention on a commercial scale. In this aspect of the invention, the fermentation is preferentially carried out for a relatively short period of time, i.e., 12 to 30 hours, the solid whole cell material is separated from the liquid fermentation broth, which is discarded, and treated as indicated hereinbefore to obtain the NPM fraction of the invention.

While it is recognized that minor amounts of product are discarded with the liquid fermentation broth, the commercial advantages of the preferred procedure set forth above far outweigh the disadvantages. For example, the shorter fermentation cycle makes it possible to conduct more fermentations per given periods of time in the same pieces of equipment. Furthermore, since the volume of the liquid fermentation broth is many folds larger than the volume of liquid obtained by autolyzing or mechanically rupturing the solid whole cell material, the need for handling large volumes of liquids is eliminated. In addition, the amount of precipitating agent necessary for carrying out the present process is greatly reduced.

A suitable xerosin-containing fermentation mixture operable in the practice of the invention is, for example, a fermentation mixture obtained by the method disclosed and claimed in the above-mentioned U.S. Pat. No. 3,039,923, i.e., by cultivating a strain of *Achromobacter xerosis* No. 134 in a synthetic complex nitrogenous liquid medium or broth in the presence of atmospheric oxygen. The fermentation can be carried out for a period of about three days, as suggested in the patent, in which case substantial amounts of the NPM fraction will be present in both the liquid fermentation broth and in the solid whole cell material. Alternatively, the fermentation cycle can be shortened to one day or less, in which case the relative amount of NPM obtainable from the cell material will be higher.

A fermentation culture medium composed of natural ingredients, i.e., glucose, bacto peptone, beef extract and yeast extract, can likewise be employed for the cultivation of the xerosin-producing organism.

The solid whole cell material is removed from the liquid broth by any known method, such as centrifugation, and the liquid fermentation broth is either discarded or, if desired, set aside for further treatment.

The solid whole cells are then either autolyzed enzymatically or ruptured by freezing and thawing, or by mechanical means, to release the liquid contents thereof. The spent cells are then separated from said liquid phase by known means, such as centrifugation, and the pH of the liquid phase is adjusted to an acid value in the range of about 2-4 by acid addition. The xerosin fraction which precipitates upon acidification, referred to as "acid-precipitated material" or APM, is removed by known means, such as centrifugation, and the pH of the liquid is adjusted to about 7 by alkali addition. To the neutralized liquid there is then added a precipitating agent in an amount sufficient to promote precipitation of the NPM fraction of the invention, which is then collected by known means, such as centrifugation.

The precipitating agents useful in the practice of the invention may be liquid or solid and are generally selected from the group consisting of water-miscible organic solvents in which the novel fractions of the invention are substantially insoluble, such as acetone, and neutral water-soluble inert inorganic salts, such as ammonium sulfate. In another aspect of the invention, precipitation of the present fractions is carried out by utilizing both types of precipitating agents sequentially, i.e., by adding a water-miscible organic solvent, such as acetone, to the neutralized liquid, separating therefrom the NPM fraction which precipitates, redissolving said fraction in an aqueous medium, and precipitating said fraction by adding to said aqueous medium a neutral water-soluble inert inorganic salt, such as ammonium sulfate.

If desired, the liquid fermentation broth from which the solid whole cell material was previously removed can be further treated to yield additional amounts of NPM by the steps outlined above, i.e. acidification, centrifugation, neutralization, and treatment with precipitating agent(s).

Another method of carrying out the invention is to autolyze or mechanically rupture the solid whole cell material while in admixture with a portion of the liquid fermentation medium. The autolyzate can then be combined with the remaining liquid fermentation medium for further treatment.

The water-miscible organic solvents useful as precipitants in the practice of the invention are liquids in which the novel fraction is substantially insoluble. Suitable liquids are, for example, acetone, dioxane and the lower aliphatic alcohols, such as ethanol and isopropanol. Acetone is the preferred water-miscible organic solvent in the practice of the invention.

The water-miscible organic solvent should be used in an amount sufficient to cause precipitation of substantially all the NPM fraction present in solution. An amount of from about 3 to about 4 volumes of precipitating agent, based on the volume of the liquid medium containing the desired product, has been found to give satisfactory results.

As a neutral water-soluble inert inorganic salt useful as a precipitating agent, there may be mentioned ammonium sulfate, which is preferred. Said salt is used in an amount sufficient to cause precipitation of substantially all the dissolved product. In general, it is preferred to add sufficient salt to the aqueous medium in which the desired product is dissolved to obtain a salt solution having a saturation of about 50 to about 75%.

The fractions of the present invention are amorphous solids, tan to white in color, slightly to very soluble in water and in acid and alkaline solutions and substantially insoluble in most organic solvent, such as benzene, chloroform, ethanol, dioxane and pyridine.

The NPM of the present invention shows positive ultraviolet absorption at 280 millimicrons. By comparison, the APM material is described by Groupe et al. as showing a peak at 255-260 millimicrons. The molecular weight of the NPM is indicated by the Sephadex exclusion technique to be higher than about 100,000.

The NPM fractions of the invention are substantially stable at ordinary temperatures but tend to lose their activity when heated to elevated temperatures.

The following examples illustrate the preparation of the fractions of the present invention.

EXAMPLE I

A culture medium (66 liters) having the following composition was inoculated with a rough strain of *Achromobacter xerosis*:

| | | |
|---|---|---|
| Yeast extract | percent | 0.3 |
| Dextrose | do | 1.0 |
| Aluminum sulfate | do | 0.5 |
| Dibasic potassium phosphate | do | 0.5 |
| Monobasic potassium phosphate | do | 0.3 |
| Magnesium sulfate | do | 0.01 |
| pH | | 7-7.2 |

Incubation was carried out for 17 hours at a temperature of 28° C. The solid whole cell material was removed from the liquid medium by centrifugation with a Sharples Super centrifuge.

The solid whole cell material thus isolated was mechanically ruptured in an Eppenbach mill and spent cell material removed by centrifugation and discarded. The pH of the resulting supernatant was adjusted to about 3.5 by careful addition of 5 N HCl and the acid-precipitated material (APM) was removed by centrifugation. The yield of APM was 29.5 g.

The pH of the resulting supernatant was adjusted to 7.0 by the addition of 1 N NaOH and four volumes of acetone was added to the neutralized solution. The resulting precipitate was collected by centrifugation after storage for about 12 hours at about 4° C. The precipitate was then dissolved in a minimum amount of sterile water and a sterile Millipore filtration was performed. All subsequent steps were carried out at about 4° C. Ammonium sulfate was added to the solution to 75% saturation and the resulting precipitate was collected by centrifugation after about 12 hours. The precipitate was redissolved in a minimum amount of sterile water, dialyzed for one day against deionized water, and lyophilized. There was obtained 3.5 g. of NPM.

The liquid culture medium which had been separated from the solid whole cell material was treated substantially as indicated hereinbefore to yield only minor quantities of both APM and NPM fractions.

EXAMPLE II

A culture medium (60 liters) was inoculated with a rough strain of *Achromobacter xerosis* and incubated for 48 hours at a temperature of about 28° C. The composition of the culture medium was as follows:

| | | |
|---|---|---|
| Dextrose | percent | 0.25 |
| Bacto peptone | do | 1.0 |
| Beef extract | do | 0.5 |
| Yeast extract | do | 0.1 |
| pH | | 7.2 |

The solid whole cell material was separated from the culture broth and the two fractions were treated separately substantially as detailed in Example I.

From the cell material, there was obtained 7.3 g. of APM and 3.8 g. of NPM. From the culture broth, there was obtained 27.7 g. of APM and 13.0 g. of NPM.

EXAMPLE III

A rough strain of *Achromobactor xerosis* was incubated for 24 hours in 60 liters of the medium having the composition set forth in Example I. The solid whole cell material was separated from the broth by centrifugation and then recombined with about one-fortieth of the volume of the resulting supernatant. The cell suspension was mechanically ruptured in an Eppenbach mill and combined with the remaining supernatant.

After the spent cell material was removed by centrifugation, the supernatant was treated as outlined in Example I to yield 15.4 g. of APM and 7.8 g. NPM.

EXAMPLE IV

The cells used in the following preparations were obtained by fermenting *Achromobacter xerosis* in 1000 liters of culture medium for 29 hours. The cells were separated from the broth by centrifugation in a Sharples superspeed centrifuge over a 9 hour period and were frozen until ready to use.

The frozen cells were divided in three parts and each part was processed as follows:

The cells were suspended in cold sterile water and disintegrated in an Eppenbach mill. The cell fragments were removed by means of a Westphalia separator and discarded. The APM was precipitated from the liquid phase by pH adjustment to 3.5 and collected by centrifugation. The pH of the liquid phase was adjusted to 7.0 and ammonium sulfate was added to the solution to a 75% saturation. The resulting NPM precipitate was colletced by centrifugation, redissolved in a minimum amount of sterile water, dialyzed against deionized water, and lyophilized.

The yields of APM and NPM from the frozen cells were, respectively, 298 grams and 81 grams.

As indicated hereinbefore, the fractions of the present invention have valuable anti-inflammatory properties in warm-blooded animals. For example, the present fractions have been found to reduce the lesions induced by influenza A virus, Newcastle disease virus, and bacterial endotoxins in the lungs of mice.

The effectiveness of the fractions of the present invention in reducing lung lesions in mice infected with influenza A virus is shown hereinafter.

Mice were infected by intranasal administration of influenza A virus, PR-8 strain. The virus was diluted in tryptose broth and three drops of the dilution (approximately 0.1 ml.), calculated to contain approximately 10,000 $LD_{50}$ of virus, were placed on the nostrils of each test animal which had previously been lightly anesthetized with chloroform. Edema and inflammation follow infection, reaching a peak after 50 to 75 hours. The disease is manifested by increase in lung weight and the development of pulmonary consolidation and pneumonia.

The test material to be administered is dissolved or suspended in pyrogen-free saline and homogenized in a tissue grinder. The homogenate is administered introperitoneally to the test animals in three 0.5 ml. doses 1, 24 and 48 hours after infection. Uninfected mice and infected mice receiving the saline carrier minus the test material serve as control groups.

The animals are sacrificed 72 hours after infection, the lungs are removed and the lesion ratings are visually determined as follows:

| | |
|---|---|
| Lungs with no lesions | 0 |
| Lungs with 1–25% lesions | +1 |
| Lungs with 26–50% lesions | +2 |
| Lungs with 51–75% lesions | +3 |
| Lungs with more than 75% lesions | +4 |
| Non-surviving mice with more than 75% lesions | +5 |

The percent lesion score is calculated from the lesion ratings as follows:

$$\text{Percent Lesion Score} = \frac{\text{Sum of lesion ratings}}{\text{No. of animals}} \times 100$$

After rating each individual lung, the trachea is removed and the lungs are weighed in groups of ten.

The effectiveness of treatment is determined by calculating the percent decrease in lung weight and the percent decrease in lesion score, in comparison with the infected controls.

In general, each sample is tested at three dose levels, with groups of 20 mice being used per level. Groups of 30 and 20 mice, respectively, are used as infected and uninfected controls.

The dose required to achieve a 30% reduction in pneumonia is graphically calculated by averaging the percent reduction of lesion score and lung weight and plotting against log dose. This figure is referred to as $ED_{30}$.

The toxicity of the test material is expressed as $LD_{50}$, which is the calculated dose, in milligrams of substance per kilogram of animal weight, at which 50% of the animals survive when administered the test material by the intraperitoneal route.

A number of fractions produced according to the method set forth in the preceding examples were tested by the above method. In Table I, which follows, "NPM" indicates the novel xerosin fractions of the present invention. Fractions of like numbers were obtained from the same source, i.e. NPM-1 was obtained from the liquid medium from which APM-1 was precipitated by acid treatment.

TABLE I

| Fraction | Source | Medium [1] | Fermentation time, hrs. | $ED_{30}$, mg./kg. | $LD_{50}$, mg./kg. |
|---|---|---|---|---|---|
| APM-1 | Broth (from Example I) | S | 17 | | |
| NMP-1 | do | S | 17 | | |
| APM-2 | Cells (from Example I) | S | 17 | >25 | >400 |
| NPM-2 | do | S | 17 | 3.2 | 100 |
| APM-3 | Broth (from Example II) | N | 48 | 32 | >400 |
| NPM-3 | do | N | 48 | 9.2 | 198 |
| APM-4 | Cells (from Example II) | N | 48 | 42 | >400 |
| NPM-4 | do | N | 48 | 6.2 | 156 |
| APM-5 | Combined cells and broth (from Example III) | N | 24 | >80 | >400 |
| NPM-5 | do | N | 24 | 21 | 167 |
| APM-6 | Cells | N | 24 | 38 | >400 |
| NPM-6 | do | N | 24 | 5 | 135 |
| APM-7 | Broth | N | 24 | 30 | 176 |
| NPM-7 | do | N | 24 | 9.4 | 184 |
| APM-8 | Cells | N | 48 | 20 | 334 |
| NPM-8 | do | N | 48 | 14 | 141 |
| APM-9 | Broth | N | 48 | 25 | 300 |
| NPM-9 | do | N | 48 | 12.5 | 142 |

[1] S=synthetic; N=natural.

As is apparent from the values set forth above, the activity of the NPM fractions of the invention is consistently substantially higher than that of the corresponding APM fractions, regardless of whether said fractions are obtained from the cells or from the broth, whether the culture medium is natural or synthetic, and the like.

What is claimed is:

1. A method for separating a xerosin fraction which is non-precipitable under acid conditions from a xerosin fermentation mixture, consisting of a first liquid phase having solid whole cell material admixed therewith, said method comprising:
   (a) separating the solid whole cell material from the first liquid phase;
   (b) autolyzing or mechanically rupturing the solid cell material as to obtain an admixture of spent cell material in a second liquid phase;
   (c) separating said spent cell material from said second liquid phase;
   (d) acidifying said second liquid phase to a pH of about 2–4;
   (e) collecting the acid-insoluble precipitate which separates therefrom;
   (f) neutralizing said second liquid phase;
   (g) adding to said second liquid phase a precipitating agent selected from the group consisting of water-miscible organic solvents and ammonium sulfate;
   (h) collecting the non-acid-precipitable fraction which precipitates therefrom; and
   (i) treating the first liquid phase from step (a) by the method of steps (d) to (h) to obtain additional non-acid-precipitable material.

2. A method for separating a xerosin fraction which is non-precipitable under acid conditions from a xerosin fermentation mixture, consisting of a first liquid phase having solid whole cell material admixed therewith, said method comprising:
   (a) separating the solid whole cell material from the first liquid phase;
   (b) autolyzing or mechanically rupturing the solid cell material as to obtain an admixture of spent cell material in a second liquid phase;
   (c) separating said spent cell material from said second liquid phase;
   (d) acidifying said second liquid phase to a pH of about 2–4;
   (e) collecting the acid-insoluble preciptate which separates therefrom;
   (f) neutralizing said second liquid phase;
   (g) adding to said second liquid phase a precipitating agent selected from the group consisting of water-miscible organic solvents and ammonium sulfate;
   (h) collecting the non-acid-precipitable fraction which precipitates therefrom.

3. A method for separating a xerosin fraction which is non-precipitable under acid conditions from a xerosin fermentation mixture consisting of a liquid phase having solid whole cell material admixed therewith, said method comprising:
   (a) separating the solid whole cell material from the liquid phase;
   (b) acidifying said liquid phase to a pH of about 2–4;
   (c) collecting the acid-insoluble precipitate which separates therefrom;
   (d) neutralizing said liquid phase and adding thereto a precipitating agent selected from the group consisting of water-miscible organic solvents and ammonium sulfate; and
   (e) collecting the non-acid-precipitable fraction which precipitates from said liquid phase.

4. A non-acid-precipitable xerosin fraction produced by the method of claim 1.

References Cited

UNITED STATES PATENTS 3,039,923   6/1962   Groupe et al. _____ 424—115

ALBERT T. MEYERS, Primary Examiner

D. M. STEPHENS, Assistant Examiner

U.S. Cl. X.R.

424—115